March 17, 1959     W. T. SIMMONS     2,877,736

CARRIER DEVICE FOR DAIRY PRODUCTS AND THE LIKE

Filed Nov. 7, 1956

INVENTOR
WILLIAM T. SIMMONS

BY *Andros and Smith*

ATTORNEYS

2,877,736
CARRIER DEVICE FOR DAIRY PRODUCTS AND THE LIKE

William T. Simmons, Albany, N. Y.

Application November 7, 1956, Serial No. 620,895

3 Claims. (Cl. 116—135)

This invention relates to a carrier device for dairy products, especially milk, cream, etc., coupled with an indicating device whereby the "milk-man" may be informed as to the products the housewife requires.

With the present tendency toward larger families, the milk required for the household has increased and, furthermore, since in many localities milk deliveries are sometimes made only three times a week, the number of bottles left at each visit has increased.

It has been common practice for the milk-man to place the usual order of milk, cream, butter, or other product on the doorstep, or in a box on the doorstep, and to pick up the empty bottles to return to the dairy. When the housewife desired to change the order, it had been the custom to write a note and place the note in the neck of one of the empty milk or cream bottles put out for pick-up by the milkman. If the order of milk, etc. consisted of more than two items it was necessary for the housewife to make several trips from the doorstep to the refrigerator.

It is an object of the present invention to provide a carrier of simple and inexpensive construction in which the dairy products may be left by the milkman at a dwelling, and in which empty containers may be left by the housewife so that repeated trips to the doorstep are avoided.

It is a further object of the present invention to provide such a carrier with means not only to indicate to the milkman the requirements of the housewife, but to remind the housewife of the products that are available in addition to milk and cream, as, orange juice, cottage cheese, etc., so the device also serves to advertise the products that are available.

Other and further objects and advantages will become apparent from the following specification, taken with the accompanying drawing, in which like characters of reference refer to similar parts in the several views and in which.

Figure 1:
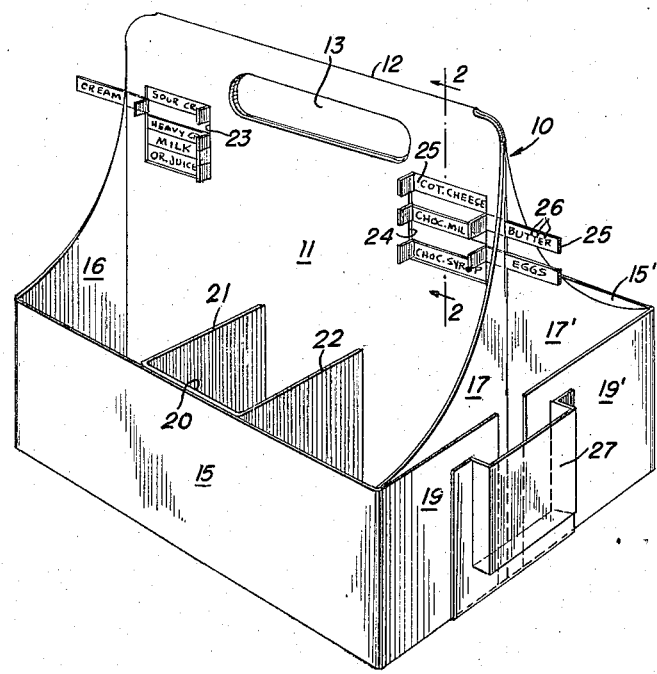
Fig. 1 is a perspective view of one illustrative embodiment of the present invention.

As seen in Fig. 1 the device of the present invention is made up of a sheet of material indicated generally at 10, cut and scored to define two similar center partition sections 11 and 11' which are joined at the top by a fold 12 to form a central, longitudinal, unitary partition member.

Each partition section 11 and 11' is provided with an aperture 13 to provide a hand hole grip by which the device may be carried.

At the lower end of each partition section 11 and 11' the material is folded outwardly to form bottom panels 14 and 14', and is then folded upwardly to form side walls 15 and 15'.

At the ends of the center partition sections 11 and 11' are end walls sections 16 and 16', and 17 and 17' which are folded outwardly from the portions 11 and 11'. These end wall sections 16 and 16', and 17 and 17', are overlapped by end wall tabs 18 and 18', and 19 and 19', which are formed as flaps extending and bent inwardly from side walls 15 and 15' to form a unitary end wall member.

To complete the carrying device, U-shaped partition elements 20 and 20', having transverse partition portions 21 and 21' and 22 and 22', folded from it and mounted in the container formed by sections 11, 14 and 15 and 11', 14' and 15', respectively, to divide the carrying device into six compartments.

It will be understood that narrow extensions or tabs may be provided at the inner ends and at the bottom of partition portions 21, 21', 22 and 22' for securement to the partition sections 11 and 11' and bottom panels 14 and 14' to reenforce the structure, if desired. Similarly, tabs may be provided either on the ends of bottom panels 14 and 14' or of end wall sections 16, 16', 17 and 17' for securement to bottom panels 14 and 14'.

The device may be made of a heavy cardboard, vulcanized fiber, sheet plastic, or other sheet material having the necessary strength and rigidity, including wire.

The means to secure the device in assembled relation may be any adhesive suitable to the material used, or may be staples or other suitable fastenings, or a combination of adhesive and staples, etc.

The size of the device is preferably such that each compartment will snugly hold a quart bottle of milk which would mean that the device when loaded would weigh slightly in excess of twelve pounds which is considered to be a practical upper limit of weight conveniently to be handled by a housewife. Other products, such as butter, cream and cottage cheese (usually purchased in lesser weights) when filling the compartments would reduce the weight of the loaded device.

While other sizes, shapes and forms of the device could be made without departing from the principle of the invention, the one described and illustrated is considered to be preferable.

The handle opening 13 should, of course, come high enough so that it may be easily grasped without interference with the necks of quart bottles of milk in the device.

Figure 2:
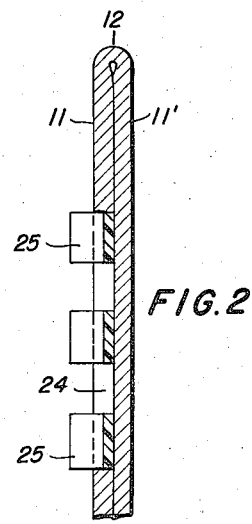
Fig. 2 is a section on line 2—2 of a portion of Fig. 1, and on an enlarged scale.
Figure 3:
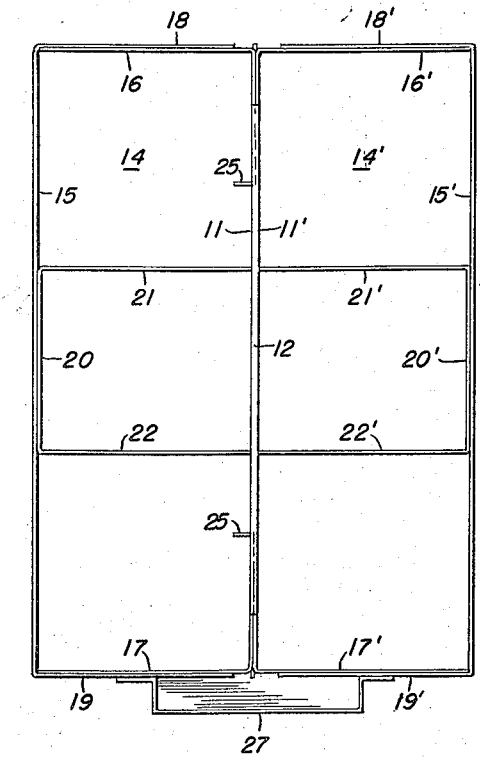
Fig. 3 is an enlarged plan view of the device of Fig. 1.

As seen in Figs. 1 and 2 especially, partition section 11 is provided with rectangular openings 23 and 24 near each end. Partition section 11 is not secured to partition section 11' along the outer side of openings 23 and 24 so that L-shaped indicator slides 25, having lettering thereon to indicate the different products available, may extend between partition sections 11 and 11' along the edge. It is clear from Fig. 1 that L-shaped members 25, which are preferably made of plastic, may be slid to extend outwardly beyond the end of the device. It will also be noted that when the L-shaped members 25 are slid back into position the lettering will also be visible, so that the housewife will know which member to slide into extended position to indicate her requirements to the milkman. Furthermore, it will be noted that the quantity of a product desired may be indicated by the degree to which the particular tab 25 extends. For example, since three vertical marks 26 are visible on the "butter" slide, the milkman will deliver three pounds of butter.

At one end of the device a pocket 27 is provided so that the milkman can deliver the bill for the month's milk, and, in unusual cases, the housewife can add a note of instruction beyond that possible with the simple indicating means provided by the L-shaped slides 25.

It will thus be seen that a simple, inexpensive device is provided by the present invention, whereby dairy products may be ordered and delivered in a convenient and efficient manner to save time and effort for both the milkman and the housewife.

It will be understood that various omissions, substitutions and changes may be made in the device as described above without departing from the spirit and scope of the appended claims.

Having described my invention, what I claim as new and desire to secure by Letters Patent is:

1. In a carrying device for transporting dairy products comprising a central vertical partition member formed of two planar partition sections of sheet material having a carrying handle, and a plurality of article receiving compartments formed on each side of said partition section, the improvement comprising at least one rectangular opening in one of said vertical partition sections adjacent one end thereof, a plurality of L-shaped indicator slides with different product indicia thereon mounted with the body of said L-shaped slides extending horizontally along said opening in the plane of said partition member to extend between said two partition sections forming said partition member at the adjacent end of said partition, and having the free end of each L-shaped indicator slide extending horizontally through said opening to form a handle by which said L-shaped slide may be slid to extend beyond the end of said partition member, whereby a housewife selectively may order such products by moving the slides into indicating position.

2. In a device as defined in claim 1, and further characterized in that said plurality of indicator slides are mounted in edge-abutting relation within said opening to maintain the same in aligned extended and retracted position.

3. In a device as defined in claim 1, and further characterized in that said L-shaped slides normally have the body of the L extending across said aperture, and extending slidably between said partition sections to the adjacent end of said partition member, and the arm of the L forming a handle extending through said aperture, whereby said indicating means may be slid longitudinally to extend beyond the end of said partition member.

References Cited in the file of this patent
UNITED STATES PATENTS

| | | |
|---|---|---|
| 1,017,806 | Rodgers | Feb. 20, 1912 |
| 1,101,826 | Woolums | June 30, 1914 |
| 1,705,061 | Jones | Mar. 12, 1929 |
| 1,903,266 | Koch | Mar. 28, 1933 |
| 2,460,108 | Smith et al. | Jan. 25, 1949 |
| 2,525,686 | Korval | Oct. 10, 1950 |
| 2,575,654 | Casler | Nov. 20, 1951 |
| 2,685,860 | Plakas | Aug. 10, 1954 |
| 2,723,643 | Weiss | Nov. 15, 1955 |